United States Patent [19]

Cardini et al.

[11] Patent Number: 5,639,044
[45] Date of Patent: Jun. 17, 1997

[54] METHODS AND APPARATUS FOR PRODUCING DYNAMO-ELECTRIC MACHINE ARMATURES WITH IMPROVED BALANCE

[75] Inventors: Giuseppe Cardini; Federico Sbalchiero; Sabatino Luciani, all of Florence, Italy

[73] Assignee: Axis USA, Inc., Tampa, Fla.

[21] Appl. No.: 689,320

[22] Filed: Aug. 6, 1996

Related U.S. Application Data

[63] Continuation of Ser. No. 192,719, Feb. 7, 1994, Pat. No. 5,576,585, which is a continuation-in-part of Ser. No. 113,852, Aug. 30, 1993, Pat. No. 5,572,786.

[51] Int. Cl.[6] .................................................. H02K 15/09
[52] U.S. Cl. .................. 242/433.1; 242/433; 310/51; 310/43
[58] Field of Search ..................... 310/51, 179, 184, 310/195, 198, 200, 43; 242/433, 433.1, 433.3, 433.4; 29/596, 605

[56] References Cited

U.S. PATENT DOCUMENTS

| | | | |
|---|---|---|---|
| 1,976,588 | 10/1934 | Thearle | 171/206 |
| 5,251,833 | 10/1993 | Furuhashi et al. | 242/7.03 |
| 5,383,619 | 1/1995 | Cardini et al. | 242/7.05 B |

FOREIGN PATENT DOCUMENTS

| | | | |
|---|---|---|---|
| 0484953 | 5/1992 | European Pat. Off. | H02K 15/16 |
| 3005423 | 8/1981 | Germany | H02K 15/16 |
| 4271256 | 9/1992 | Japan | H02K 15/16 |
| 503337 | 1/1977 | U.S.S.R. | H02K 15/16 |
| 1644302 | 4/1991 | U.S.S.R. | 310/182 |

*Primary Examiner*—Steven L. Stephan
*Assistant Examiner*—Judson H. Jones
*Attorney, Agent, or Firm*—Fish & Neave; Robert R. Jackson

[57] ABSTRACT

Armatures for dynamo-electric machines are balanced during manufacture by measuring the unbalance of the armature assembly prior to winding the coils on the armature. The numbers of turns of wire in at least some of the coils subsequently wound on the armature are then adjusted so that the unbalance of the resulting coils compensates for the unbalance of the armature prior to coil winding. Alternatively, one or more extra turns of wire that are short-circuited at the commutator may be added to help balance the armature. In addition, masses may be added to the armature to ensure that it is balanced dynamically as well as statically.

16 Claims, 12 Drawing Sheets

METHODS AND APPARATUS FOR PRODUCING DYNAMO-ELECTRIC MACHINE ARMATURES WITH IMPROVED BALANCE

This is a continuation of application Ser. No. 08/192,719, now U.S. Pat. No. 5,576,585 filed Feb. 7, 1994, which is a continuation-in-part of application Ser. No. 08/113,852, now U.S. Pat. No. 5,572,786 filed Aug. 30, 1993.

BACKGROUND OF THE INVENTION

This invention relates to methods and apparatus for producing armatures for dynamo-electric machines such as electric motors and generators, and more particularly to improving the balance of such armatures.

The principal components of a dynamo-electric machine armature are typically a shaft, an axially slotted lamination stack or core mounted concentrically on the shaft, a commutator also mounted concentrically on the shaft, insulating end fibers at respective opposite axial ends of the lamination stack, insulating papers in the slots in the lamination stack, coils of wire wound on the lamination stack chiefly by passing through the slots in the stack with coil lead wires extending to the commutator, and a resin coating applied to at least the axial ends of the coils to help stabilize the coils.

It is becoming increasingly important for such armatures to be well balanced about the central longitudinal axis of the armature shaft. This increased importance is due, for example, to a growing interest (on the part of motor manufacturers and users) in motors that operate more smoothly, more reliably, with longer lives, and at higher speeds. The traditional techniques for balancing armatures include subjecting the annular outer surface of the lamination stack to a turning operation to ensure concentricity of that surface with the shaft, milling one or more axial grooves in the outer surface of the lamination stack to remove material from the side of the armature found to be heavier, and/or adding extra resin to the coil ends on the side of the armature found to be lighter. It would be desirable, however, to assemble the armature in such a way that unbalance is eliminated or at least substantially reduced so that the required extent of the above-mentioned traditional balancing operations can be at least substantially reduced. For example, removal of large amounts of material from the outer surface of the lamination stack by annular turning or axial milling may reduce the efficiency of the resulting motor. Also, to the extent that different amounts of material must be removed from different armatures, these techniques are not consistent with producing motors having uniform operating characteristics.

In view of the foregoing, it is an object of this invention to provide dynamo-electric machine armatures with improved balance.

It is a more particular object of this invention to provide methods for assembling dynamo-electric machine armatures in such a way that their balance is improved prior to the manufacturing stage in which final balancing operations are traditionally performed so that the extent to which such traditional final balancing operations must be carried out is at least substantially reduced.

SUMMARY OF THE INVENTION

These and other objects of the invention are accomplished in accordance with the principles of the invention by measuring the unbalance of the armature prior to the coil winding operation, and then winding the coils of the armature so that the coils are unbalanced in a way that compensates for the previously measured unbalance. For example, the direction and magnitude of unbalance prior to coil winding may be measured. Then the coils wound around a diameter of the lamination stack which is aligned with the unbalance direction may be wound so that the coil on the side of the armature opposite the unbalance direction has more turns of wire than the parallel coil on the other side of the armature. The difference in the number of turns of wire between these two coils may be such that the wire mass difference times the radial distance from the center of the armature through which that mass difference acts is equal to the magnitude of the unbalance of the armature measured prior to coil winding. Because the direction of coil unbalance is opposite the direction of unbalance prior to coil winding, the deliberately unbalanced winding substantially cancels out the unbalance prior to winding, thereby producing a fully assembled armature which requires little or no final balancing such as by axial milling of the outer surface of the lamination stack.

As an alternative form of the foregoing, the armature may be wound with one or more extra turns of wire on the otherwise underweight side, which extra turns of wire are not part of the normal electrical circuits of the armature. These extra turns of wire preferably have beginning and ending leads that are both connected to the same electrical region of the armature's commutator without any connections to other electrical regions of the commutator between those beginning and ending leads. Accordingly, the extra turns of wire are electrically short-circuited by the commutator, even though the wire used to form these extra turns may be continuous with the wire used to form other, normal, open-circuited coils on the armature.

In addition to ensuring static balance of the armature as described above, dynamic balance may be achieved by adding masses to the armature in such a way as to cancel out any dynamic unbalance. For example, masses of a dense resinous gel may be added to the axial ends of the coils to eliminate or at least substantially reduce any dynamic unbalance. The magnitudes of these masses and their radial and axial locations on the armature are preferably chosen so that they do not affect the static balance of the armature but so that they are effective to counteract the dynamic unbalance of the armature.

Further features of the invention, its nature and various advantages will be more apparent from the accompanying drawings and the following detailed description of the preferred embodiments.

BRIEF DESCRIPTION OF THE DRAWINGS

FIG. 5 is a simplified cross sectional view of the armature assembly shown in FIG. 4. FIG. 5 includes a vector diagram useful in explaining the principles of this invention.

3

FIG. 7 is another simplified elevational view of the apparatus shown in FIG. 6. FIG. 7 is taken from the left in FIG. 6, and shows some elements schematically.

DETAILED DESCRIPTION OF THE PREFERRED EMBODIMENT

Figure 1:
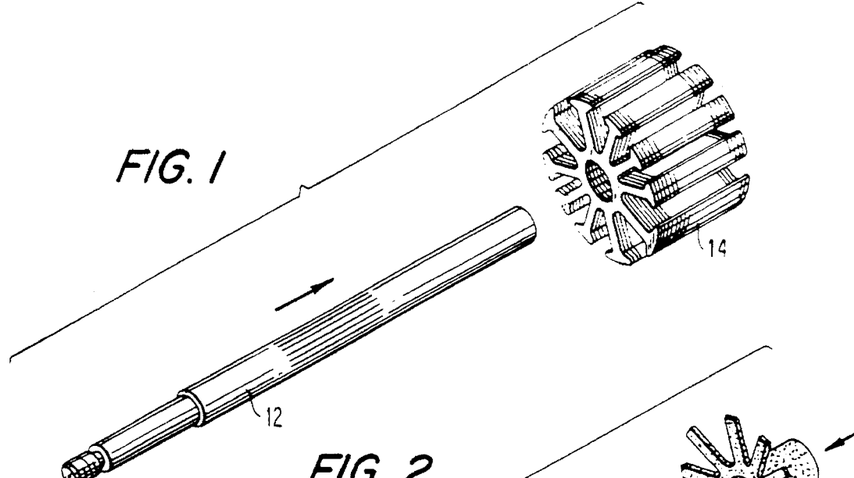
FIG. 1 is an isometric view of an early stage in the assembly of a typical armature for a dynamo-electric machine.
Figure 2:
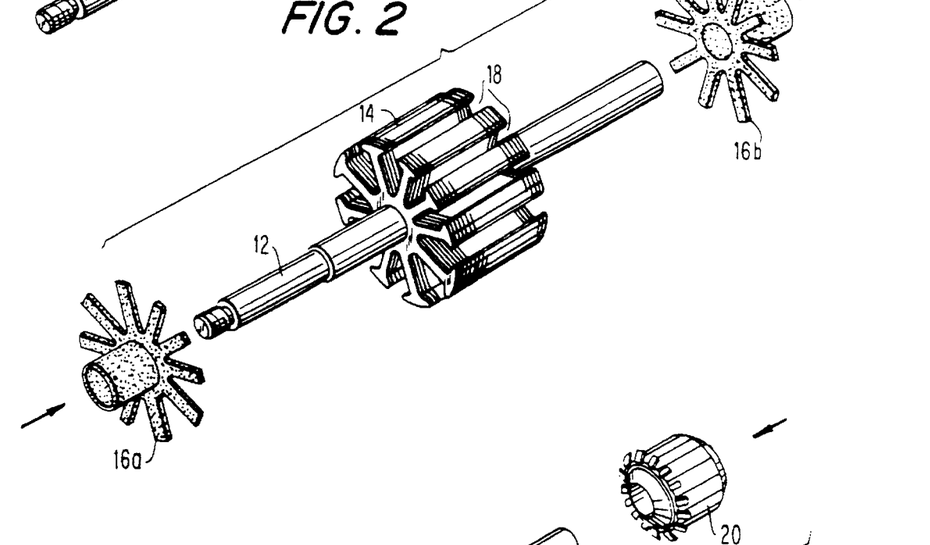
FIG. 2 is a view similar to FIG. 1 showing a subsequent stage in the assembly of a typical dynamo-electric machine armature.
Figure 3:
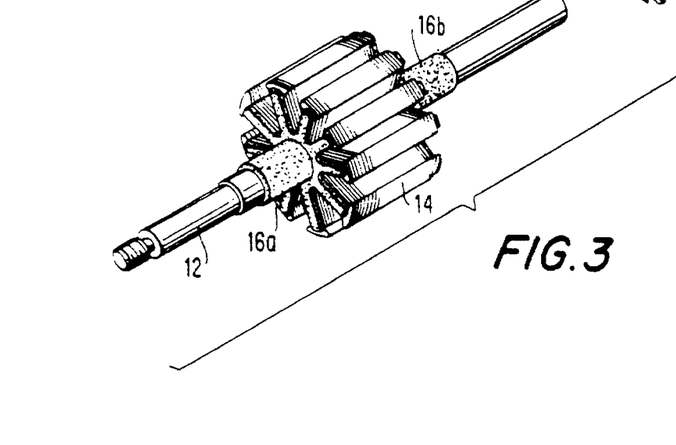
FIG. 3 is another view similar to FIG. 1 showing a further subsequent stage in the assembly of a typical dynamo-electric machine armature.
Figure 4:
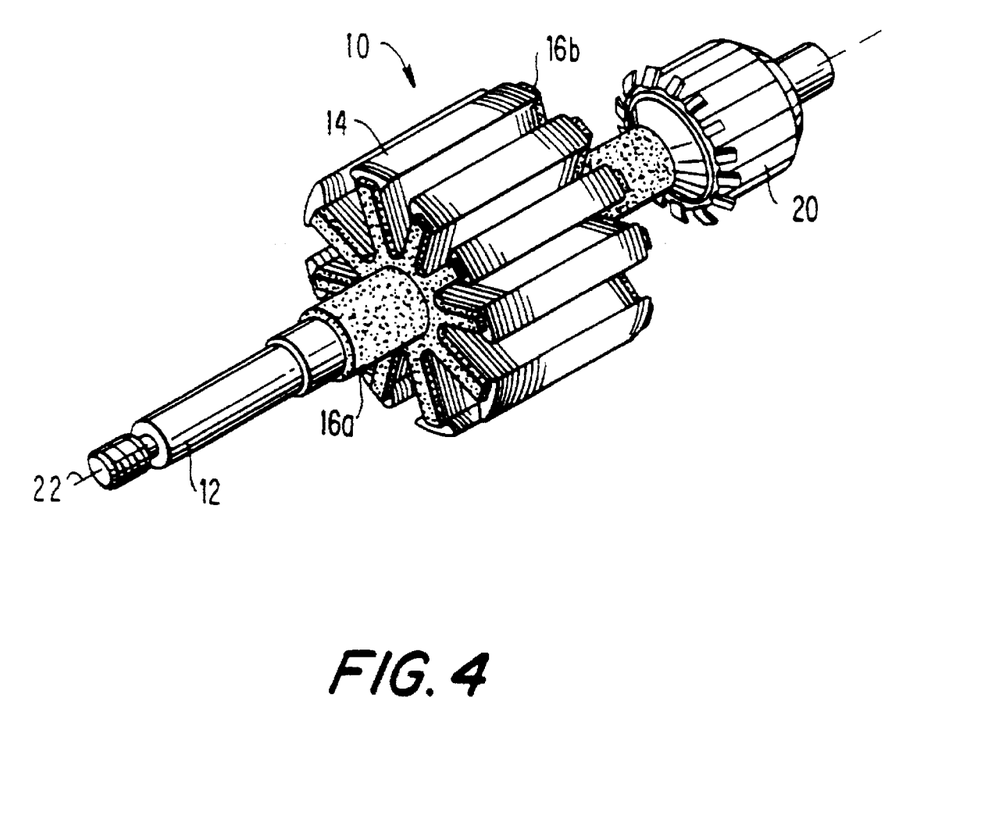
FIG. 4 is still another view similar to FIG. 1 showing a still further subsequent stage in the assembly of a typical dynamo-electric machine armature.

Assembly of a typical armature prior to winding is shown in FIGS. 1–4. In FIG. 1 a stack 14 of laminations of ferromagnetic material is pressed onto armature shaft 12. In FIG. 2 insulating end fibers 16a and 16b are pressed onto shaft 12 against respective opposite axial ends of lamination stack 14. Insulating papers (not shown) may also be inserted into the axial slots 18 in lamination stack 14. In FIG. 3 commutator 20 is pressed onto one axial end of shaft 12. The armature assembly 10 ready for winding is shown in FIG. 4.

The armature structure shown in FIG. 4 may be unbalanced about the central longitudinal axis 22 of shaft 12 as a result of any of several factors. The production of shaft 12 requires lathing and grinding a steel bar with extremely precise tolerances. Once the shaft has been produced, it is subjected to a straightening operation and is then placed within lamination stack 14 as shown in FIG. 1. By itself shaft 12 typically has relatively little unbalance about axis 22, although some unbalance of the shaft is always possible.

Lamination stack 14 is produced by punching individual laminations from steel sheets, and then assembling a stack of such individual laminations. The individual laminations may not be perfectly balanced due to variations in the thickness of the sheet from which a given lamination is cut, imprecision in the shape of the lamination, etc. The unbalance vectors of the individual laminations in stack 14 sum together to produce the net unbalance vector of stack 14. This may be the single largest source of unbalance in armature assembly 10, especially because stack 14 is typically the component of assembly 10 with the largest diameter and the greatest mass. The substantially cylindrical external surface of lamination stack 14 may be subjected to a lathe turning operation to ensure concentricity of that surface with axis 22. But stack 14 may still be significantly unbalanced about axis 22 due to such factors as nonuniform sheet thickness, imprecise lamination shape, etc.

In end fibers 16 imperfect mass distribution, imprecise geometry, and lack of concentricity with axis 22 may be another source of unbalance in assembly 10.

Still another source of unbalance in assembly 10 may be commutator 20, which may have less than perfect concentricity with shaft 12 or less than perfect mass distribution about axis 22. Commutator 20 may be subjected to a lathe turning operation to ensure concentricity of its substantially cylindrical external surface with axis 22, but imperfect mass distribution in the commutator may not be completely eliminated by this operation.

Figure 5:
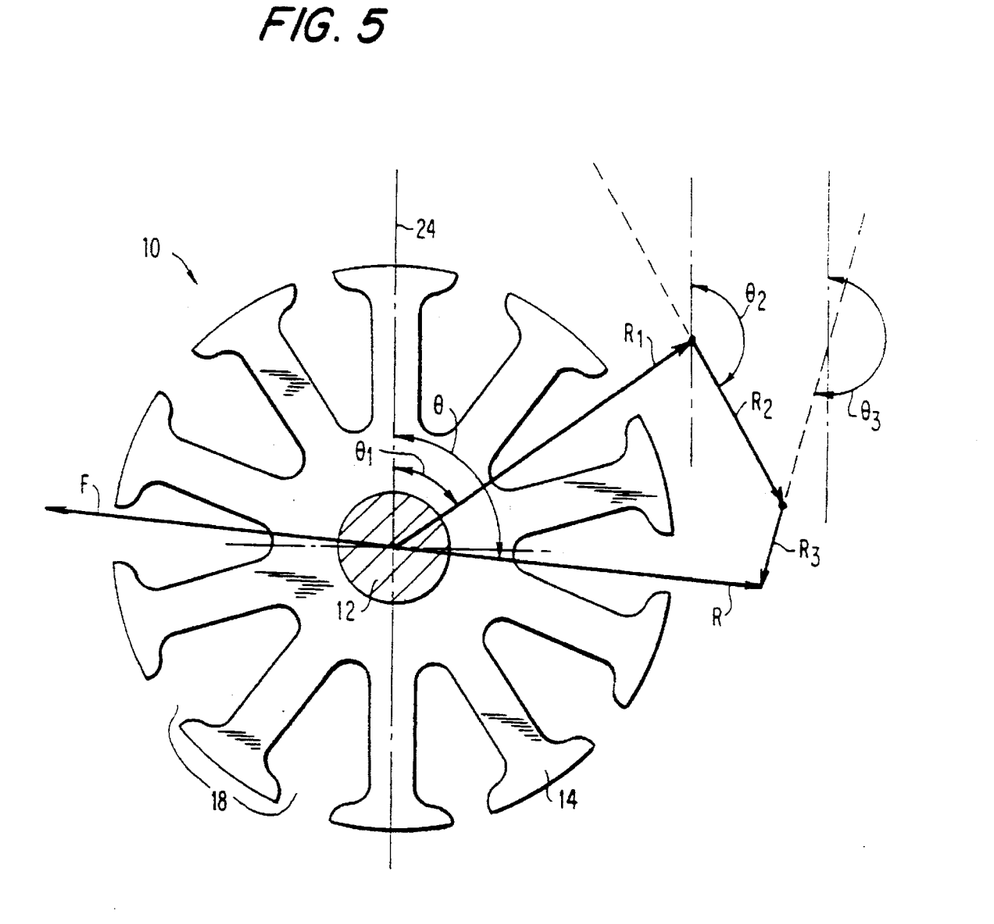

FIG. 5 shows a typical net unbalance vector R which may result from several individual unbalance sources such as are described above. In particular, vector R (having angle theta from radial reference axis 24) is the vector sum of individual unbalance components $R_1$, $R_2$, and $R_3$ (having angles $theta_1$, $theta_2$, and $theta_3$, respectively, from reference axis 24). Unbalance component $R_1$ may be due, for example, to lamination stack 14, unbalance component $R_2$ may be due to commutator 20, and unbalance component $R_3$ may be due to end fibers 16. As shown in FIG. 5 static balance can be restored to assembly 10 by adding another unbalance component F to the assembly, component F being equal and opposite to vector R.

In accordance with the present invention, the magnitude and direction of net unbalance vector R are determined. This can be accomplished, for example, by placing assembly 10 in unbalance measuring apparatus 100 of the type shown in FIGS. 6 and 7. This apparatus, which may be conventional and commercially available, includes floating supports 102a and 102b for supporting the respective opposite axial ends of shaft 12 via idle wheels 104. Assembly 10 is then rotated about axis 22 by a motor-driven belt 106 which is pressed against the outer cylindrical surface of lamination stack 14. Any unbalance of assembly 10 causes supports 102 to reciprocate (as indicated by the double-headed arrow 108 in FIG. 7) as assembly 10 is thus rotated. Sensor 110 detects this reciprocation and applies a corresponding signal to the controls 120 of the machine. At the same time sensor 112 periodically reads a reference mark which has been placed at a particular angular location on the cylindrical surface of commutator 20. (Alternatively, sensor 112 may keep track of the angular location of the armature by detecting features of the commutator such as its bars 21a or tangs 21b.) The output signal of sensor 112 is also applied to machine controls 120. Controls 120 can therefore determine the magnitude and direction (theta) of unbalance vector R. Vector magnitude is determined from the amplitude of the reciprocation detected by sensor 110. Vector direction is determined from the phase relationship between the reciprocation detected by sensor 110 and the reference mark (or other angular orientation) readings produced by sensor 112.

If desired, the values of vector R magnitude and direction determined as described above can be marked (in encoded form) on assembly 10 by a marking tool 130 driven by controls 120. Alternatively, any other suitable technique can be used for associating with assembly 10 the values of vector R magnitude and direction determined by apparatus 100 so that those values are available for future reference during the subsequent processing of that particular assembly. In the depicted embodiment, however, it will be assumed that marking tool 130 is used to record the vector magnitude and direction on the outer cylindrical surface of lamination stack 14 at a particular angular location (e.g., at a predetermined angular location relative to the reference mark read by sensor 112 or, alternatively, at a predetermined location relative to the direction of vector R).

Figure 7:
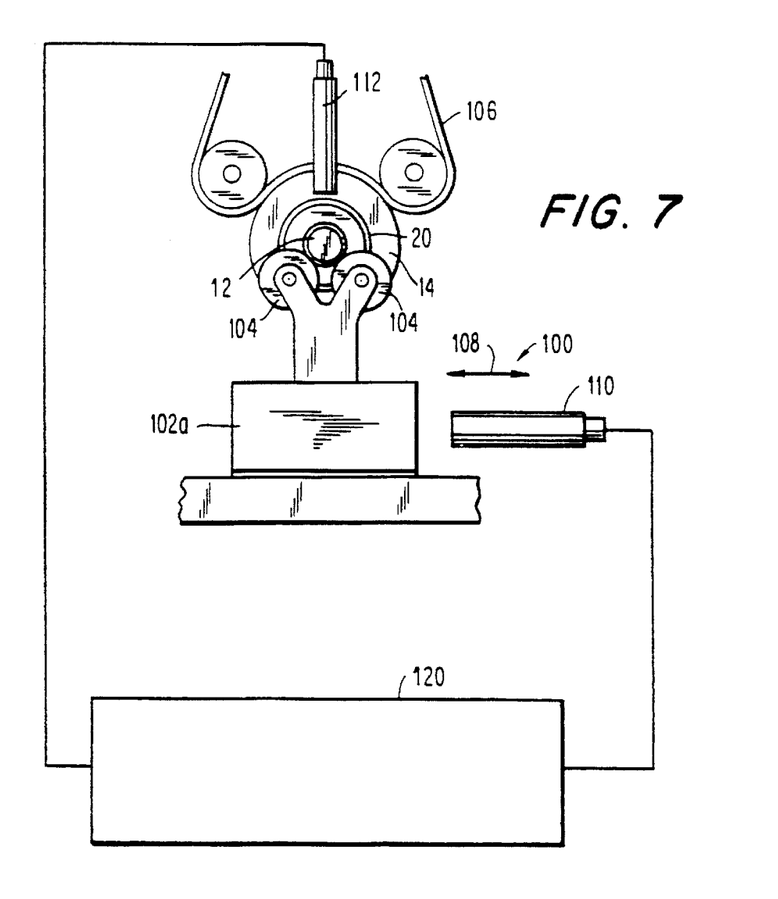
Figure 8:
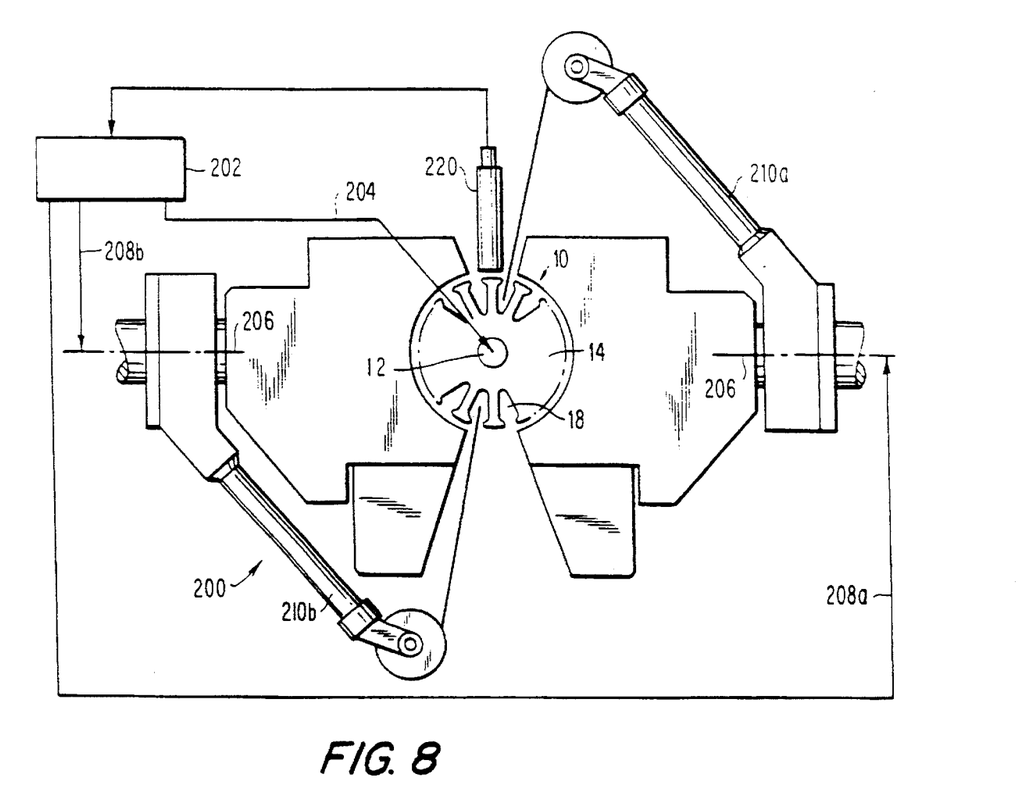
FIG. 8 is a partly schematic, simplified, elevational view of illustrative armature winding apparatus which can be employed in the practice of this invention.

After the magnitude and direction of net unbalance vector R have been determined as described above, assembly 10 may be placed in a coil winding machine 200 such as is shown in FIG. 8. In the particular embodiment shown in the drawings, coil winding machine 200 is a conventional dual-flyer type winding machine. It will be understood, however, that any other type of coil winding machine (e.g., machines of the type shown in commonly assigned, co-pending application Ser. No. 07/738,199) can be used instead if desired. In accordance with this invention, coil winding machine 200 is augmented by sensor 220 for reading from the cylindrical outer surface of lamination stack 14 the unbalance vector data previously inscribed there by marking tool 130 in FIGS. 6 and 7. The controls 202 of winding machine 200 use the machine's conventional armature rotating components 204 to rotate assembly 10 until sensor 220 can read the unbalance vector data from assembly 10.

Figure 9:
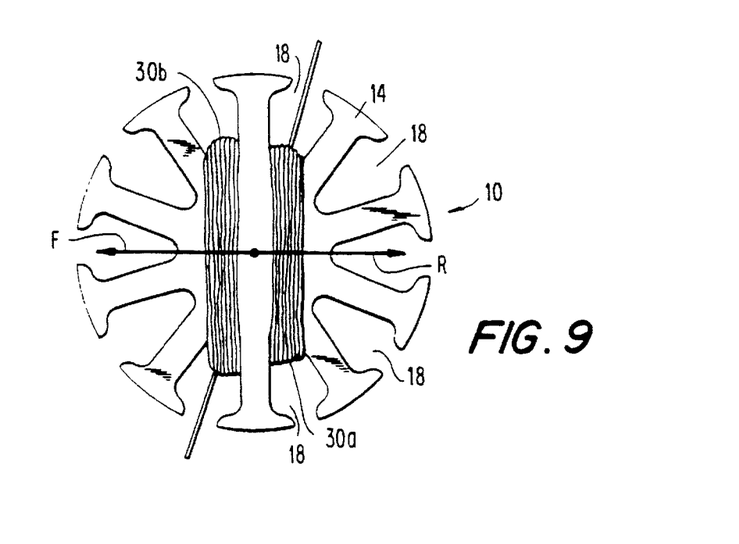
FIG. 9 is a view similar to FIG. 5, but shows the armature partly wound in accordance with this invention.

Winding machine controls 202 use the unbalance vector data read by sensor 220 to modify the coil winding process to compensate for the unbalance of assembly 10. As shown in FIG. 9, for example, winding machine may compensate for unbalance vector R by winding coil 30$b$ with sufficiently more mass than coil 30$a$ so that the unbalance vector F which results from this coil unbalance is equal and opposite to vector R. As is conventional, coils 30$a$ and 30$b$ are diametrically opposite to one another in diametrically opposite pairs of slots 18 in lamination stack 14. Coils 30$a$ and 30$b$ are wound at substantially the same time by flyers 210$a$ and 210$b$, respectively. Flyers 210$a$ and 210$b$ are respectively rotated about axis 206 by conventional flyer rotating components 208$a$ and 208$b$ controlled by controls 202.

Normally coils 30$a$ and 30$b$ would have the same number of turns and would be of the same size. Coils 30$a$ and 30$b$ would therefore normally be balanced about armature axis 22. However, in accordance with this invention, winding machine controls 202 cause flyer 210$b$ to apply more turns of wire to coil 30$b$ than flyer 210$a$ applies to coil 30$a$. Controls 202 calculate the number of turns of wire by which coil 30$b$ must differ from coil 30$a$ in order to substantially compensate for vector R. For example if the parallel planes in which coils 30 lie are spaced apart by a perpendicular distance 2$d$, and if the mass of a turn of wire in each coil is m, then the difference n in number of wire turns between coils 30$b$ and 30$a$ required to offset unbalance vector R is given by the equation:

$$n = R/md \qquad (1)$$

where R in this equation is the magnitude of unbalance vector R. If winding machine 200 winds coil 30$b$ with n more turns than coil 30$a$, then coils 30 will have an unbalance vector whose magnitude is given the equation:

$$F = nmd \qquad (2)$$

Because coils 30 are wound in planes that are perpendicular to vector R with the larger coil 30$b$ in the direction away from vector R, vector F is directed away from vector R. Equal and opposite vectors F and R cancel one another and restore static balance to armature 10.

It will be appreciated that winding machine controls 202 determine not only the number of turns by which coils 30$a$ and 30$b$ must differ from one another, but also the angular position at which coils must be wound on lamination stack 14 so that coil unbalance vector F is directed oppositely from vector R. This can be done in any of several ways. For example, the apparatus of FIGS. 6 and 7 can rotate assembly 10 so that marking tool 130 always marks the outer surface of lamination stack 14 at a location which is 90° counter-clockwise from vector R as viewed from commutator 20. Assuming that the end of assembly 10 visible in FIG. 8 is the commutator end, winding machine controls 202 will know that when sensor 220 can read the unbalance markings from tool 130, the coils it is about to wind on assembly will be in planes perpendicular to vector R, and that these are therefore the coils to be modified to compensate for R. Moreover, controls 202 will know that (like coil 30$b$ in FIG. 9) the coil on the left is to be made larger than the coil on the right. The only parameter controls 202 must then compute is n as in equation (1) above. Of course many other techniques can be used to enable controls 202 to determine which coils to modify to produce an appropriate coil unbalance vector F.

In the example shown in FIG. 9 only one pair of coils must be modified to produce a vector F of appropriate magnitude and direction. In this example all other coil pairs (either wound before or after coils 30) can be wound in the conventionally balanced manner. If lamination stack 14 were configured differently, or if vector R were directed differently (e.g., along one of the arms of stack 14 in FIG. 9), it might be necessary to modify two pairs of coils in the manner described above in order to produce a net coil unbalance vector F directed oppositely to vector R. It will be readily apparent to those skilled in the art how this capability can be included.

It may also be desirable to have winding machine 200 base the angular orientation of all the coils to be wound on assembly 10 on the direction of unbalance vector R. For example, the coil winding pattern may be such that the last coils to be wound on the armature tend to be the largest and most massive (e.g., because they at least partly overlie previously wound coils). These last coils may also tend to have the largest moment arms d in equations (1) and (2). Thus both variable m and variable d may be greatest for these coils. A given magnitude of vector R may therefore be offset with a smaller difference in number of wire turns in these coils than in any previously wound pair of coils. In addition, because these coils are wound last, they can be of different sizes without having any secondary effects on the sizes, shapes, or balance of any other coils.

If it is desired to base the angular orientation of all coils on the direction of vector R as described above, assembly 10 can be rotated in apparatus 100 so that marking tool 130 marks the vector R data on lamination stack 14 at the angular location where that data can be read by sensor 220 when apparatus 200 has rotated assembly 10 to the position at which winding must begin in order for the last-wound coils to be in planes perpendicular to vector R. Again, this is only one example of how the data regarding the direction of vector R can be communicated to winding machine controls 202 so that winding machine 200 can rotate assembly to the angular position at which coil winding should start so that the last coils wound are those that are to be used to produce coil unbalance vector F. It will also be appreciated that in other coil winding patterns it may be desired that particular coils other than the last-wound coils are to be used to produce vector F. It will be apparent from the foregoing how the systems of this invention can use the direction of vector R to cause winding machine 200 to rotate assembly 10 to a coil winding start position such that, when the desired coils are being wound, vector R has a desired orientation relative to those coils (e.g., vector R is substantially perpendicular to the planes in which those coils are being wound).

Figure 10:
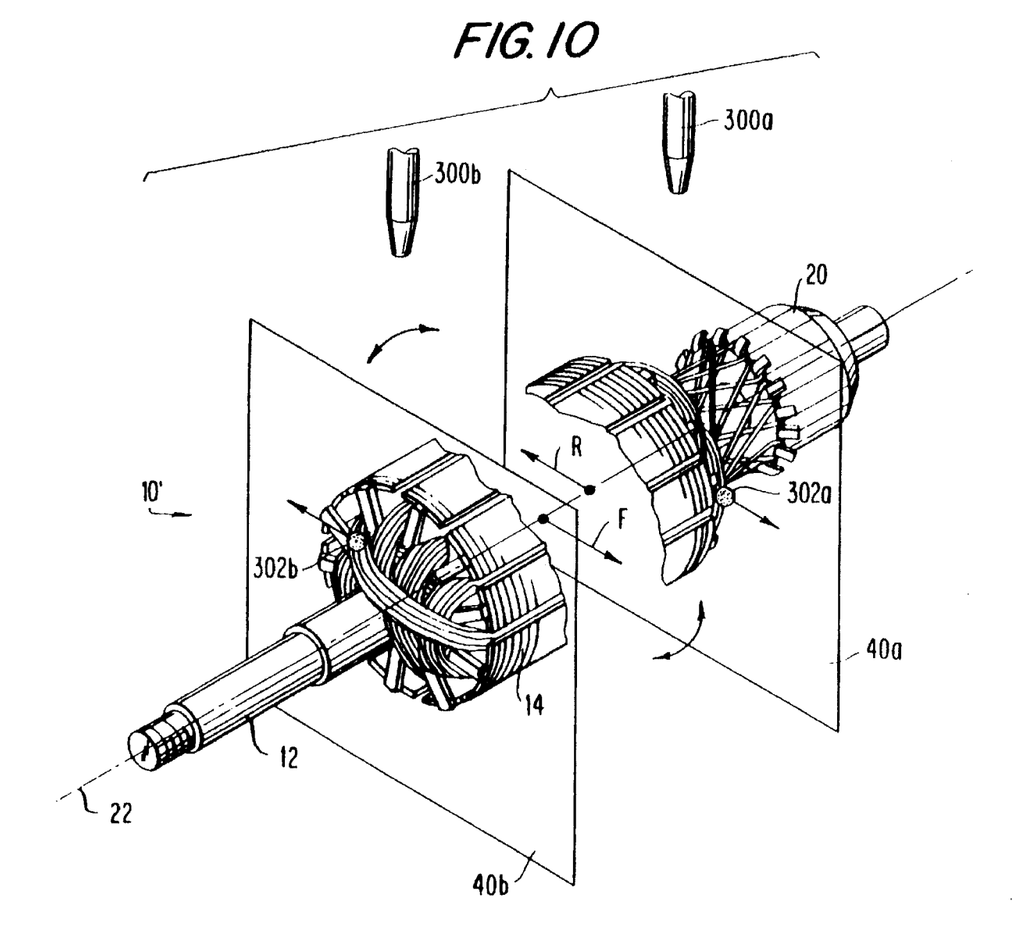
FIG. 10 is a fragmentary isometric view of an armature wound in accordance with this invention, together with apparatus for ensuring that the armature is dynamically balanced.

FIG. 10 shows armature 10' after it has been completely wound. It will be apparent from this FIG. that the armature is statically balanced because the magnitudes of vectors R and F are equal and their directions are opposite to one another. However, as FIG. 10 also shows, vectors R and F may not be in the same plane perpendicular to axis 22. The axial location of vector F tends to be always at the axial center of lamination stack 14 because the coils are axially centered on that stack. Vector R, however, has components that may not be axially centered on lamination stack 14. For example, any contribution to R from commutator 20 will axially displace R toward the commutator. Thus although wound armature 10' is statically balanced by R and F, it may not be dynamically balanced. In particular, when armature 10' is rotated at high speed, as when it is used in a motor, the axial offset between R and F produces a couple in the plane defined by vectors R and F. This couple can eliminated by a dynamic balancing operation of this invention as will now be described.

Figure 6:
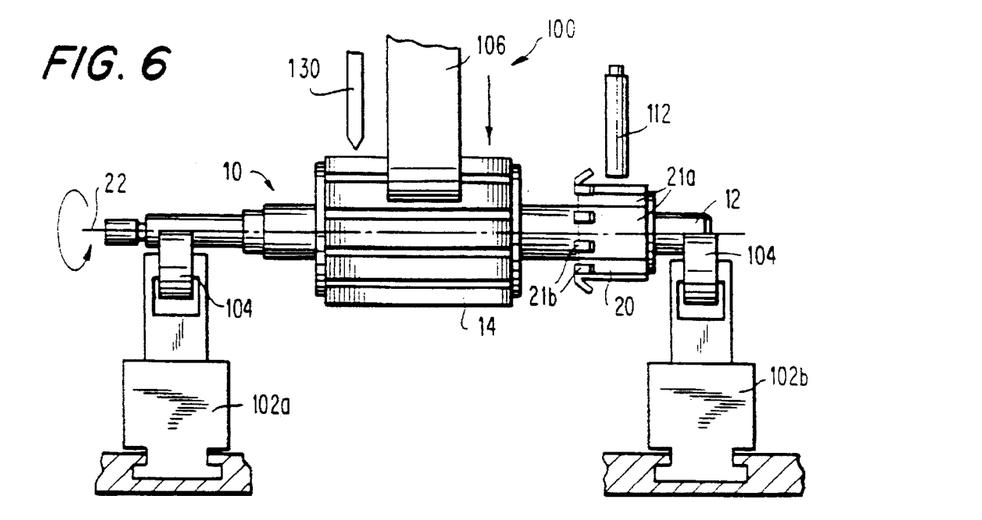
FIG. 6 is a simplified elevational view, partly in section, of illustrative armature unbalance measuring apparatus which can be employed in the practice of this invention.

The dynamic unbalance characteristics of wound armature 10' can be determined by placing armature 10' in unbalance measuring apparatus similar to that shown in FIGS. 6 and 7. In this case, however, the dynamic unbalance characteristics are determined from differences in the motions of floating supports 102a and 102b as armature 10' is rotated in the unbalance measuring apparatus. Once the characteristics of the dynamic unbalance have been determined, the armature is placed in another machine (indicated by resin dispensers 300a and 300b in FIG. 10). (Any of the techniques discussed above for transfer of unbalance information from machine 100 to machine 200 can be used for transferring dynamic unbalance information from the apparatus which measures dynamic unbalance to the apparatus which includes resin dispensers 300.) Each of dispensers 300 can add mass (e.g., a quantity of a dense resinous gel) to a respective opposite axial end of the coils wound on lamination stack 14. In particular, dispenser 300a adds gel mass 302a to armature 10' in plane 40a, while, dispenser 300b adds gel mass 302b to armature 10' in plane 40b. The apparatus which includes dispensers 300 rotates armature 10' about axis 22 so that gel masses 302 are deposited on diametrically opposite sides of the armature, preferably in the plane defined by vectors R and F. The positions of gel masses 302 relative to axis 22 are such that when armature 10' is rotated about axis 22, the couple produced by masses 302 is opposite to the couple associated with vectors R and F. In addition, the magnitudes and radial locations of masses 302 are such that the magnitude of the couple produced by masses 302 is equal to the magnitude of the couple associated with vectors R and F. The couple of masses 302 therefore cancels the couple of vectors R and F, and armature 10' is dynamically balanced.

Masses 302 are preferably equal to one another and equally spaced from axis 22 so that they do not disturb the static balance of the armature. If R is the magnitude of vector R (or the magnitude of equal and oppositely directed vector F) and s is the axial spacing between vectors R and F, then to achieve dynamic balance the mass M of each mass 302 should be determined by the equation:

$$M = Rs/rS \quad (3)$$

where r is the radial distance from axis 22 to either of masses 302, and S is the axial distance between those masses (i.e., between planes 40). Each of dispensers 300 is accordingly controlled to dispense a mass M.

Assuming that masses 302 are a resin material generally like the material that is typically used to impregnate at least the axial ends of the coils, masses 302 may be applied during the usual resin impregnation operation or immediately after that operation. Preferably, masses 302 are applied prior to the operation by which the impregnation resin is cured. In this way both the impregnation resin and masses 302 are cured together in one curing operation which ensures firm anchoring of masses 302.

It will be noted from equation (3) that if the apparatus of FIGS. 6 and 7 determines the axial location of vector R, everything necessary to compute M is known even prior to the coil winding operation. This is so because the vector F always has the same axial location (i.e., at the axial center of lamination stack 14). This makes it possible to omit subjecting the armature to a second unbalance measuring operation after winding.

Figure 11:
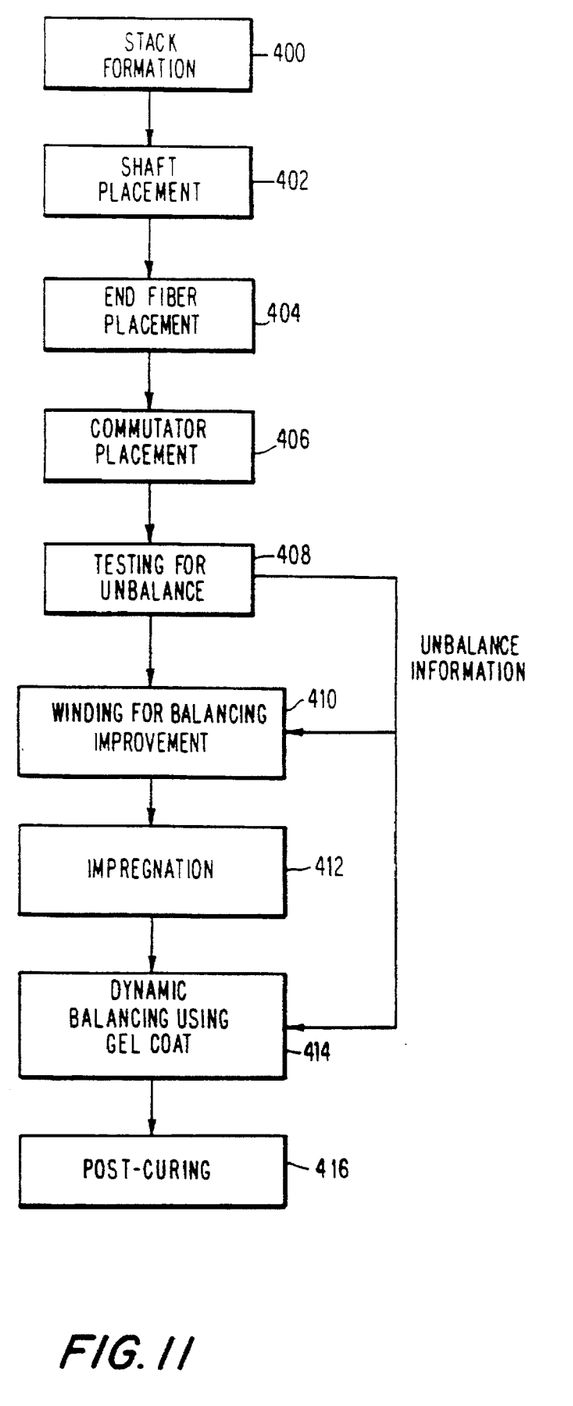
FIG. 11 is a simplified flow chart of illustrative steps for making an armature in accordance with this invention.
Figure 12:
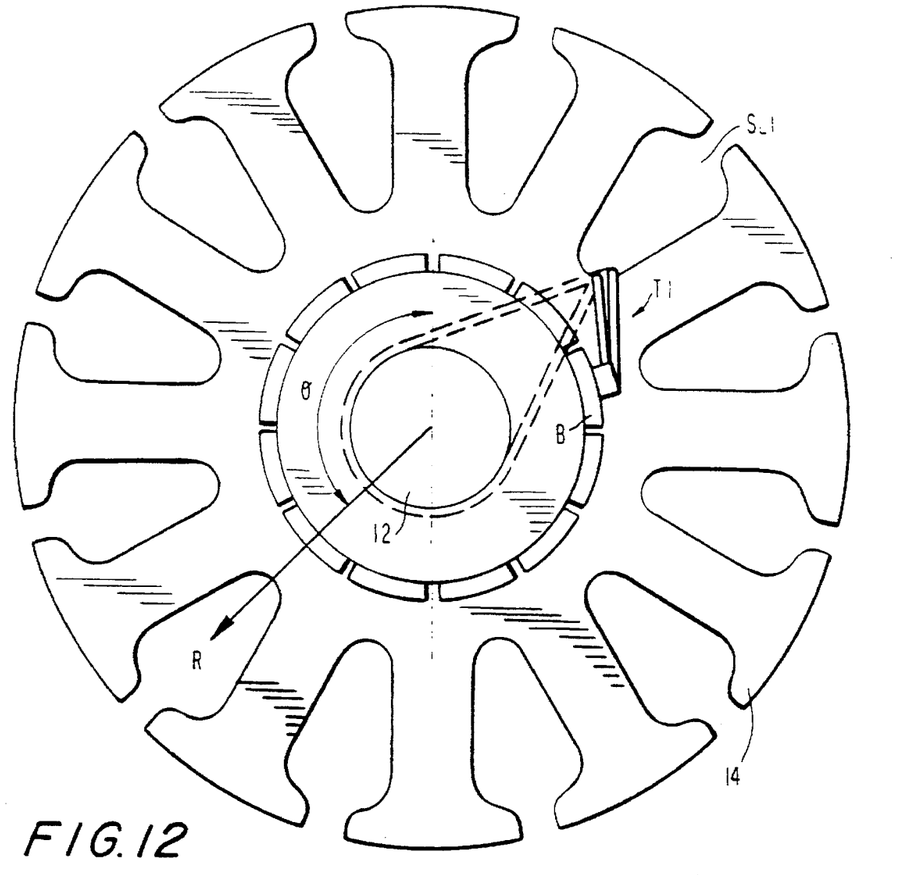
FIG. 12 is a simplified elevational view of illustrative armature apparatus showing a representative extra turn of wire applied in accordance with a further or alternative aspect of this invention.
Figure 13:
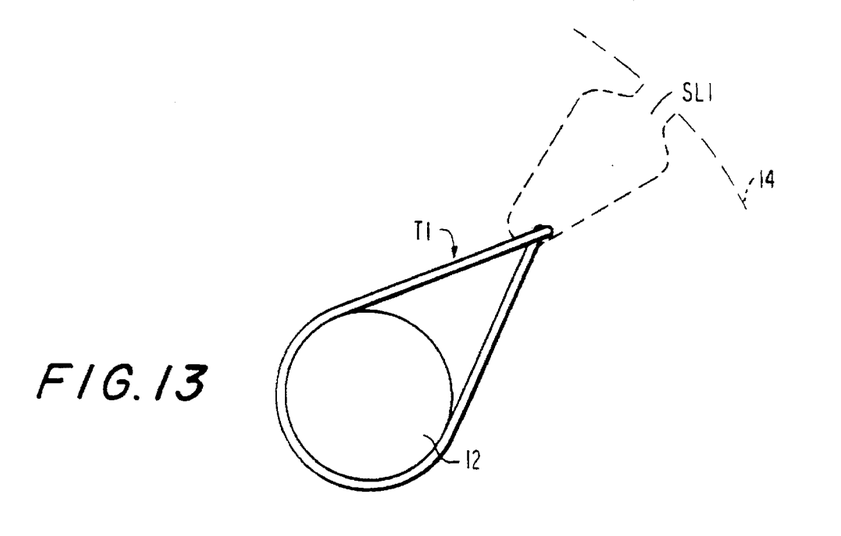
FIG. 13 is a simplified, partial, elevational view of the apparatus of FIG. 12 as seen from the opposite axial end.

FIG. 11 is a summary of the steps which can be carried out in accordance with this invention to produce armatures that are both statically and dynamically balanced. In step 400 lamination stack 14 is formed. In step 402 shaft 12 is pressed into stack 14 as shown in FIG. 1. In step 404 end fibers 16 are placed on the assembly as shown in FIG. 2. In step 406 commutator 20 is placed on the assembly as shown in FIG. 3. In step 408 assembly 10 is tested as shown, for example, in FIGS. 6 and 7 to determine the magnitude, direction, and axial location of unbalance vector R. In step 410 assembly 10 is wound with coils as shown, for example, in FIGS. 8 and 9. This winding operation includes adjusting the number of wire turns in certain coils to compensate (in a static balance sense) for vector R. Unbalance information from step 408 is accordingly employed in step 410. In step 412 the coils are impregnated with resin in the conventional manner. In step 414 gel masses 302 are added to the wound armature as shown, for example, in FIG. 10 to substantially eliminate any dynamic unbalance of the armature. Again, unbalance information from step 408 is used in step 414. (This unbalance information may be transferred from step 408 to step 414 by any of the techniques discussed above for transfer of such information from step 408 to step 410.) Finally, in step 416 the resin material applied in steps 412 and 414 is all subjected to a curing operation.

In the foregoing discussion it is assumed that the wire turns added to or deleted from various coils in order to improve the balance of the otherwise normal coils of the armature are wire turns that are included in the electrical circuits of the otherwise normal coils of the armature. In accordance with another aspect of this invention, however, wire turns that are not part of the armature's normal electrical circuits may be added to improve armature balance. This aspect of the invention will now be discussed with reference to FIGS. 12–17. (Preliminarily it should be noted that all of FIGS. 12–17 have been simplified by omitting many turns of wire in the typical normal armature coils, and also by not explicitly showing more than one representative extra turn of wire in accordance with this invention.)

Figure 14:
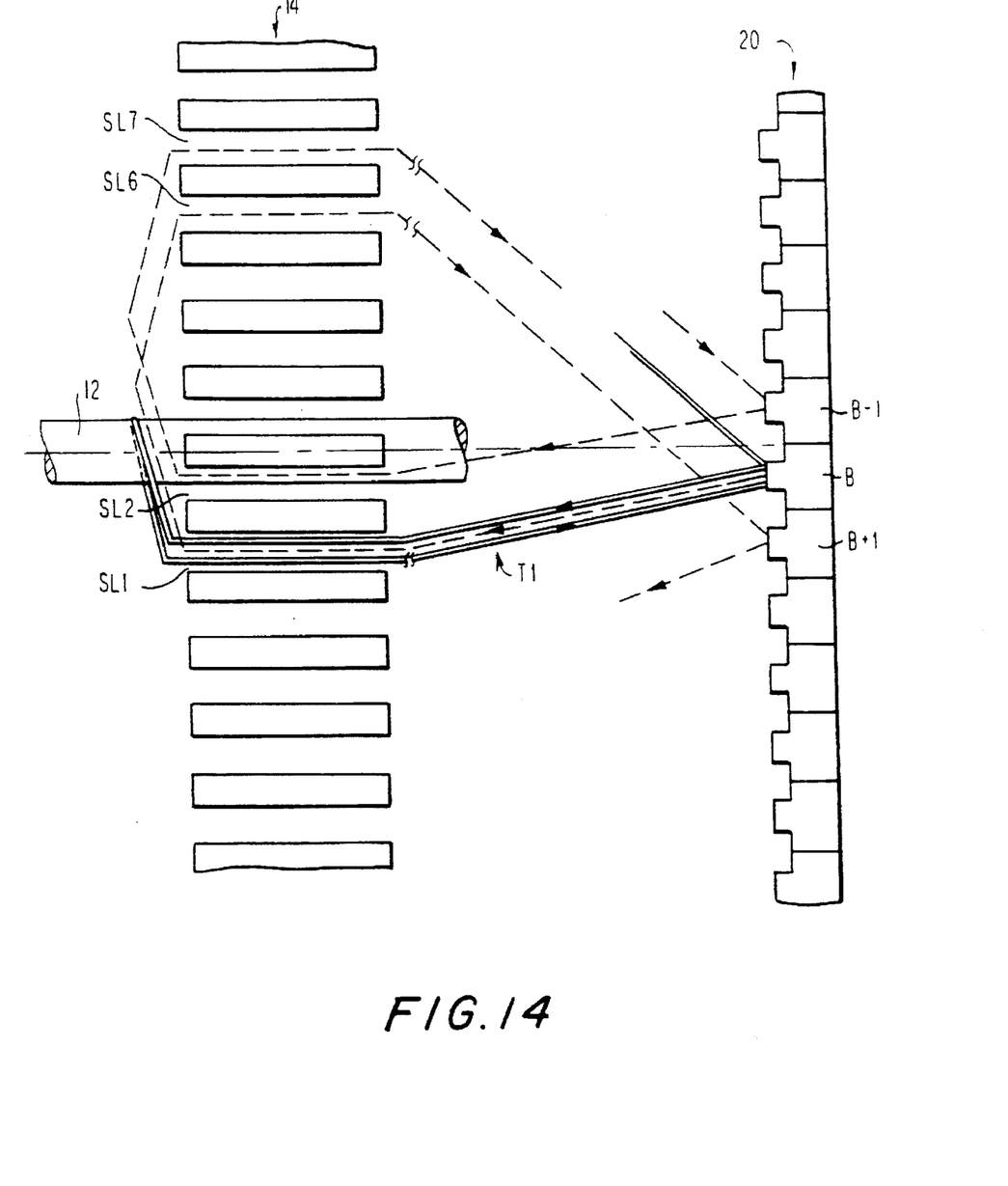
FIG. 14 is a simplified, illustrative armature winding diagram that is useful in explaining the further aspect of this invention illustrated by FIGS. 12 and 13.
Figure 15:
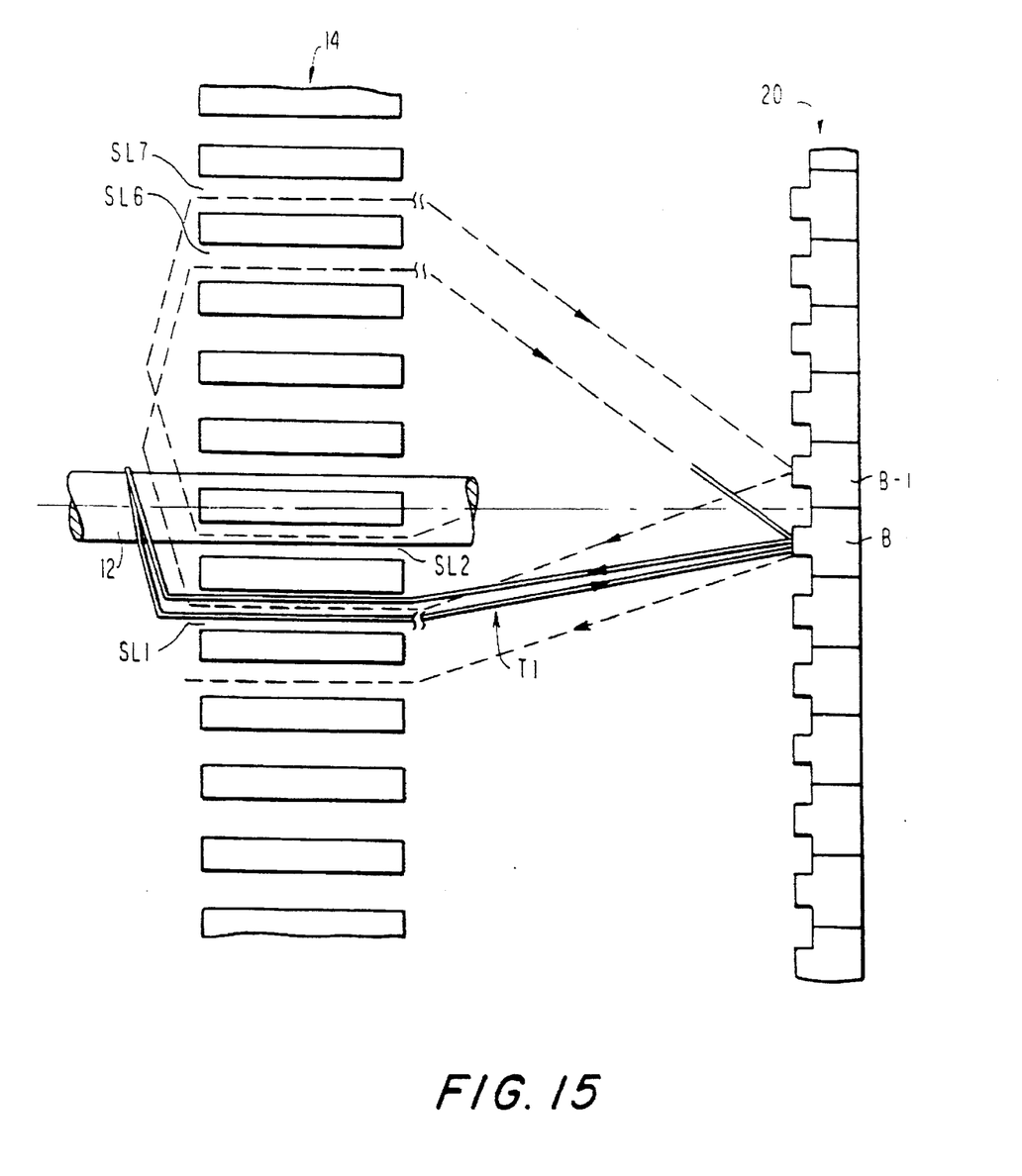
FIG. 15 is a view similar to FIG. 14 showing an illustrative alternative armature winding diagram in accordance with this invention.

FIGS. 12–15 show adding one or more wire turns T1 that start and end at the same point B on the commutator and that pass in both directions through the same armature slot SL1. (In FIGS. 12–15 (as well as in FIGS. 16 and 17) the designations of the commutator bars are sometimes changed from FIG. to FIG. so that in all cases the commutator bar at which extra wire turns T1 (and T2) begin and end is designated bar B.) In FIGS. 12–15 slot SL1 is selected to receive extra wire turns T1 because it is the slot which is most nearly diametrically opposite previously determined armature unbalance vector R (which has previously determined angle theta from a reference axis of the armature). FIG. 14 shows adding extra wire turns T1 before continuing to use the wire to wind normal coil turns in slots SL1 and SL6, while FIG. 15 shows adding such extra wire turns to slot SL1 after the normal coil turns have been wound in slots SL1 and SL6. In both cases the extra wire turn or turns T1 are not part of the normal electrical circuits of the armature because they start and end at the same point B on the commutator. Extra wire turns T1 are therefore short-circuited by the commutator.

With continued reference to FIGS. 12–15, an extra wire turn T1 starts at the tang of commutator bar B, passes axially through armature core slot SL1, wraps or loops around armature shaft 12 adjacent the end of lamination stack or core 14 that is remote from commutator 20, and then passes in the opposite direction back through slot SL1 to the tang of commutator bar B. If more than one extra wire turn T1 is needed in slot SL1, the wire can be wrapped or looped around armature shaft 12 between lamination stack 14 and commutator 20 (similar to the depicted wrapping of the wire around shaft 12 at the other end of core 14) and then passed back to slot SL1 to begin another turn T1. In this way, any number of extra wire turns T1 can be added to the armature. The last of these turns T1 is terminated by returning it to the commutator bar B from which the first turn T1 began.

FIGS. 14 and 15 show winding extra wire turns T1 at different times in the normal sequence of winding the normal armature coils. In FIG. 14, for example, the last of the turns of the normal coil in slots SL2 and SL7 is concluded by passing the wire from slot SL7 to commutator bar B. The extra wire turn or turns T1 are then wound as described above beginning and ending at commutator bar B and passing back and forth through slot SL1. After the desired number of turns T1 has been applied, the normal coil in slots SL1 and SL6 is wound beginning from commutator bar B. As has been mentioned, the FIG. 14 winding sequence places extra wire turns T1 in slot SL1 beneath the turns of the normal coil wound in slots SL1 and SL6.

Greater benefit in balancing the armature results from each of extra wire turns T1 per se when those turns are radially outside the turns of the normal coil wound in slots SL1 and SL6. This is so because portions of extra wire turns T1 are then radially farther from shaft 12 and therefore have a greater moment or lever arm for offsetting unbalance vector R. FIG. 15 shows a coil winding sequence that places extra wire turns T1 radially outside the normal coil turns in slot SL1. The last turn of the normal coil wound in slots SL2 and SL7 concludes by passing the wire from slot SL7 to commutator bar B−1. The wire is then passed from that commutator bar to slot SL1 to begin winding the normal coil in slots SL1 and SL6. The last of these normal coil turns concludes by passing the wire from slot SL6 to commutator bar B. Extra coil turns T1 are then wound as described above, starting and ending at bar B. The wire is then extended from bar B to begin winding the next normal coil in the next pair of slots.

Figure 16:
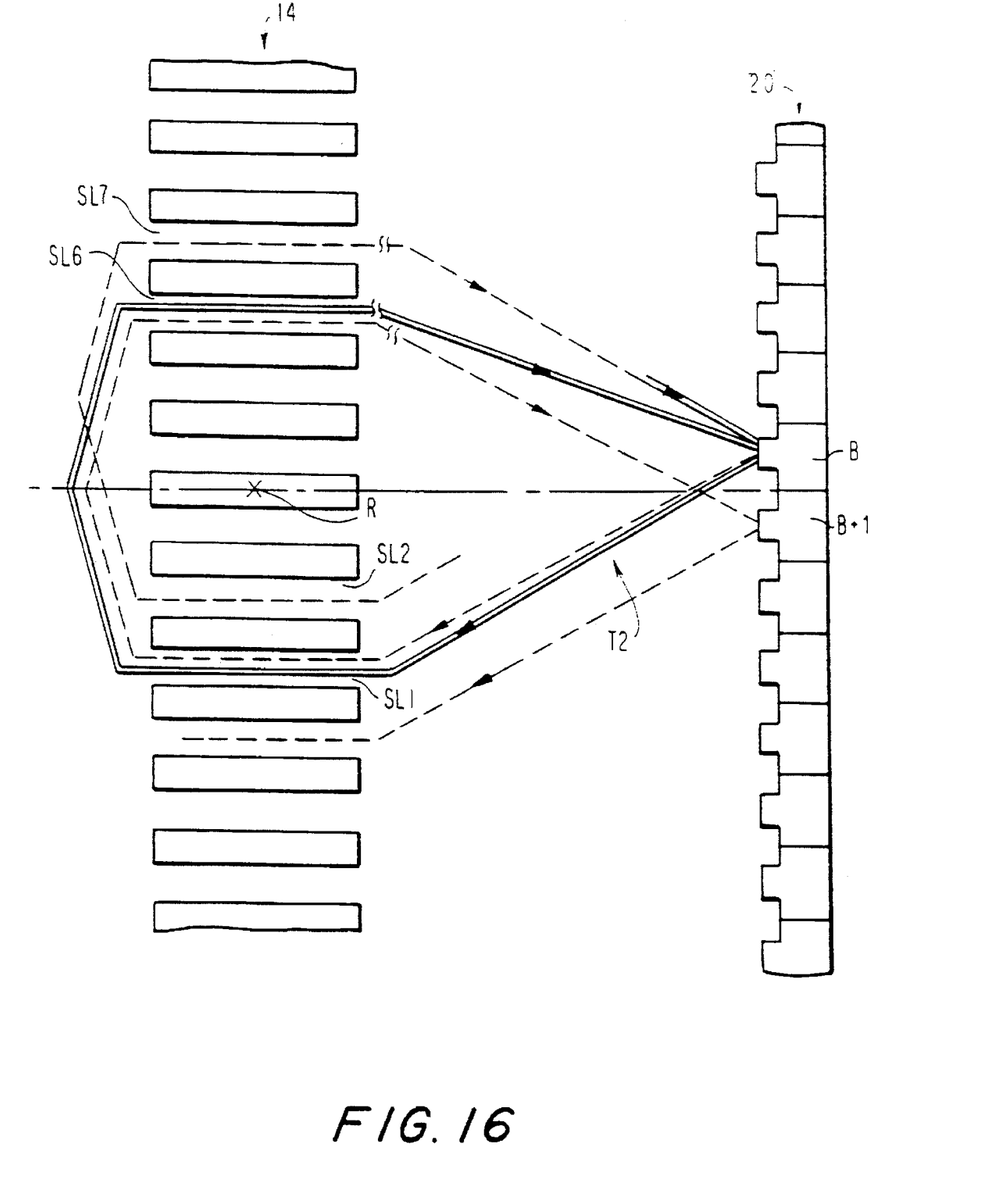
FIG. 16 is another view similar to FIG. 14 showing another illustrative alternative armature winding diagram in accordance with this invention.
Figure 17:
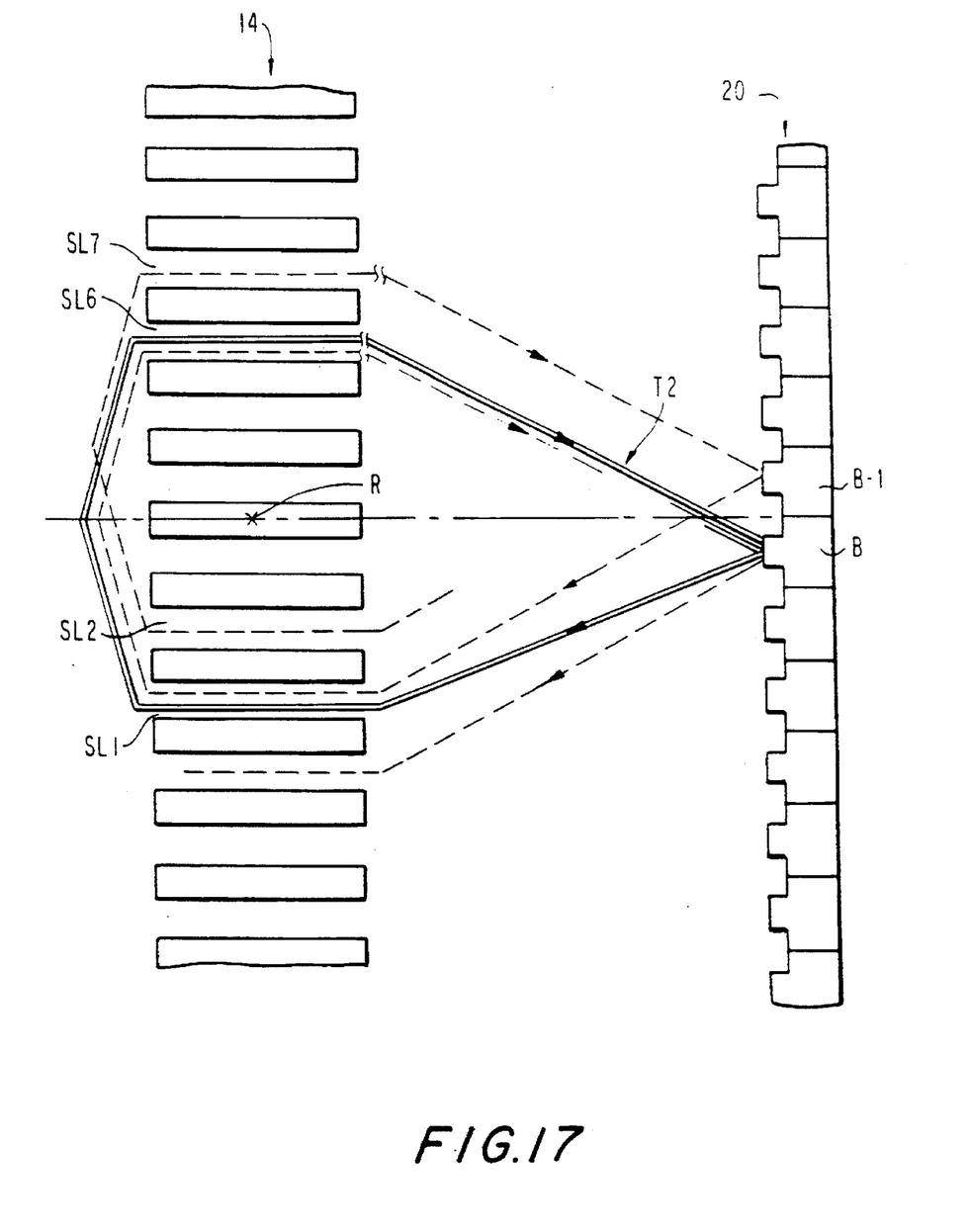
FIG. 17 is still another view similar to FIG. 14 showing still another illustrative alternative armature winding diagram in accordance with this invention.

In the alternatives shown in FIGS. 16 and 17, extra wire turns T2 have approximately the same configuration as normal coil turns, but they are again not part of the normal electrical circuits of the armature because (like extra wire turns T1) they begin and end at the same commutator bar B. Extra wire turns T2 are therefore short-circuited by the commutator. FIG. 16 shows winding extra coil turns T2 in slots SL1 and SL6 in the normal sequence of normal coil winding but before the normal coil is wound in slots SL1 and SL6. This places extra wire turns T2 beneath the turns of the normal coil in slots SL1 and SL6. FIG. 17, on the other hand, shows a winding sequence which places extra wire turns T2 radially outside the normal coil turns in slots SL1 and SL6, thereby increasing the moment or lever arm of turns T2 per se as compared to FIG. 16. In both FIGS. 16 and 17 slots SL1 and SL6 are selected to receive extra wire turns T2 because this centers turns T2 approximately diametrically opposite to previously determined armature unbalance vector R.

In FIG. 16 the last turn of the normal coil wound in slots SL2 and SL7 concludes by passing the wire from slot SL7 to commutator bar B. Extra wire turns T2 are then wound in slots SL1 and SL6 beginning and ending at commutator bar B. Extra turns T2 are similar to the turns of a normal coil except that the starting and ending leads of these extra turns both go to the same commutator bar B. Any number of turns T2 may be provided. The last of these turns concludes by passing the wire from slot SL6 back to commutator bar B, after which the wire is again passed to slot SL1 to begin winding the normal coil in slots SL1 and SL6. The last turn of this normal coil concludes by passing the wire from slot SL6 to commutator bar B+1.

In the alternative shown in FIG. 17 the last turn of the normal coil wound in slots SL2 and SL7 concludes by passing the wire from slot SL7 to commutator bar B−1. From commutator bar B−1 the wire is passed to slot SL1 to begin winding the normal coil in slots SL1 and SL6. The last turn of that normal coil concludes by passing the wire from slot SL6 to commutator bar B. The wire is then passed from commutator bar B back to slot SL1 to begin winding extra turns T2 in slots SL1 and SL6. Again, any number of such turns T2 may be provided, each turn being like a normal coil turn wound in these same slots except that the last turn T2 concludes by passing from slot SL6 back to commutator bar B. The wire is then extended from bar B to begin winding the next normal coil in the next pair of slots.

While all of the alternatives shown in FIGS. 12–17 have the advantage that the extra coil turns T1 or T2 are short-circuited by the commutator and not part of the normal electrical circuits of the armature, extra coil turns T1 have the further possible advantage of producing less induced negative electromotive forces in the finished motor than extra coil turns T2. This is due to the fact that each turn T1 is a closed turn having side by side, oppositely directed, parallel stretches in the same slot. Coil turns T2 may induce higher negative electromagnetic forces in the finished motor than coil turns T1 due to the ferrous stack material between the slots in which coil turns T2 are wound.

Although FIGS. 14–17 show producing extra wire turns T1 or T2 at particular times during the sequence of normal coil winding, turns T1 and T2 can alternatively be produced at other times. This may necessitate using wire that is separate from the wire used to wind the normal coils. For example, turns T1 or T2 can be applied before any of the normal coils are wound, or turns T1 or T2 can be applied after all of the normal coils have been wound. If extra wire turns T1 or T2 are applied after all of the normal coils have been wound, the unbalance of the armature with all of its normal coils can be measured and all of that unbalance can be addressed (e.g., eliminated or substantially reduced) by means of extra turns T1 or T2.

The number of extra wire turns T1 or T2 needed to cancel or at least substantially offset a previously measured unbalance vector R can be determined using the principles discussed above in connection with FIGS. 1–11. Similarly, the appropriate angular location for turns T1 or T2 can determined as discussed above in connection with FIGS. 1–11. In each case, extra wire turns T1 or T2 are located on the armature so that their center of mass is laterally spaced from the central longitudinal axis of shaft 12 in a perpendicular direction from that axis which is at least approximately opposite the direction of unbalance vector R. The mass of extra wire turns T1 or T2 is preferably such that the product of this mass times the perpendicular distance between the central longitudinal axis of shaft 12 and the center of this mass is approximately equal to the magnitude of unbalance vector R.

Extra wire turns T1 or T2 can be wound on the armature, for example, by appropriately programming coil winding apparatus such as that shown in FIG. 8 to produce the required relative movements (rotations) of the armature and one of flyers 210. These programmed motions include appropriate positioning of slots such as SL1 and SL6 relative to the wire guides of the coil winding apparatus, as well as the motions required to draw the wire around shaft 12 (if necessary) and to connect the wire to commutator bar B.

The magnitude and direction of unbalance vector R in FIGS. 12–17 may be determined as described above in connection with FIGS. 1–11. This data may also be communicated to the winder as described above in connection with those FIGS. or by any other suitable means. For example, if the armature assemblies are conveyed between workstations on pallets, the unbalance data (i.e., the magnitude and direction of unbalance vector R) can be conveyed between workstations via coded devices on the pallets. At the station which determines the unbalance vector data, that data is recorded on the code device on the pallet which carries the armature assembly associated with that data. At the winding station where the unbalance will be corrected, the unbalance data is read from the pallet code device. As another alternative, each pallet used to transport armature assemblies may have a unique, readable name. At the station which measures armature assembly unbalance, the name of the pallet associated with each armature assembly is read from the pallet and linked in a central machine control memory to the unbalance data for the associated armature assembly. Then, at the winding station where the unbalance is to be corrected, the name of each pallet is read again so that the central machine control memory can supply the unbalance data for the associated armature assembly and thereby appropriately control winding of that armature assembly to reduce or eliminate its unbalance. These techniques can also be used for the alternatives shown in FIGS. 1–11.

It may be desirable to avoid having too many wire leads connected to any one commutator bar. The area available for attaching wire leads to each commutator bar is limited, and it may be difficult to properly fuse a large number of wires to a bar. These considerations may make it preferable to avoid having extra wire turns T1 or T2 start and end at a commutator bar that also has multiple lead wires from normal coils. This can be achieved by appropriate angular registration of the normal coil winding pattern relative to the direction of unbalance vector R so that, for example, a commutator bar that must receive separate start and finish leads from the normal coil windings does not also have to serve as the common beginning and ending point for extra wire turns T1 and T2.

The dynamic balancing described above in connection with FIGS. 1–11 can of course be performed after static balancing as illustrated by FIGS. 12–17.

It will be understood that the foregoing is only illustrative of the principles of this invention, and that various modifications can be made by those skilled in the art without departing from the scope and spirit of the invention. For example, masses 302 can alternatively be applied in a manufacturing stage other than that described above (e.g., after the impregnation resin has been cured). Whenever masses 302 are applied, however, there should thereafter be a curing operation which causes those masses to harden and permanently adhere to the armature.

The invention claimed is:

1. The method of operating a winding machine to wind wire on an armature structure for use in a dynamo-electric machine, said armature structure including a shaft, a core mounted concentrically on said shaft at a first location, and a commutator mounted concentrically on said shaft at a different second location, said core having a plurality of radially inwardly projecting slots aligned with said shaft and spaced from one another around said shaft, and said commutator having a plurality of electrically conductive regions that are electrically insulated from one another and spaced from one another around said shaft, said armature structure, prior to performance of said method, being unbalanced about said shaft by an unbalance vector R which has a known direction substantially perpendicular to said shaft, said method comprising operating said winding machine to perform the step of:

contacting a predetermined one of said regions with a wire in order to form a beginning of a turn of said wire at said one of said regions;

winding said turn of wire on said core, said turn of wire extending from said beginning, so that the center of mass of said turn of wire is laterally spaced from the axial center of said shaft in a direction which is approximately opposite to said known direction; and after performing said winding step, returning said wire from said turn to said one of said regions for another contact with said one of said regions and thereby ending said turn of wire without extending said wire to any others of said regions between said beginning and ending.

2. The method defined in claim 1 wherein said winding step comprises the steps of:

extending said wire from said predetermined one of said regions to a first of said slots;

passing said wire axially along and through said first slot to the end of said core which is remote from said commutator;

wrapping said wire around said shaft adjacent said end of said core which is remote from said commutator; and passing said wire axially back along and through said first slot toward said commutator.

3. The method defined in claim 2 wherein, after performance of the steps specified in claim 2, said winding step comprises the further step of:

extending said wire passed back along and through said first slot to said predetermined one of said regions.

4. The method defined in claim 2 wherein, after performance of the steps specified in claim 2, said winding step comprises the further steps of:

wrapping said wire passed back along and through said first slot around said shaft between said core and said commutator; and again passing said wire axially along and through said first slot to the end of said core which is remote from said commutator.

5. The method defined in claim 1 wherein said winding step comprises the steps of:

extending said wire from said predetermined one of said regions to a first of said slots;

passing said wire axially along and through said first slot to the end of said core which is remote from said commutator;

extending said wire along said end of said core which is remote from said commutator from said first slot to a second of said slots; and passing said wire axially back along and through said second slot toward said commutator.

6. The method defined in claim 5 wherein, after performance of the steps specified in claim 5, said winding step comprises the further step of:

extending said wire passed back along and through said first slot to said predetermined one of said regions.

7. The method defined in claim 5 wherein, after performance of the steps specified in claim 5, said winding step comprises the further steps of:

extending said wire passed back along and through said second slot along the end of said core which is adjacent to said commutator from said second slot to said first slot; and again passing said wire axially along and through said first slot to the end of said core which is remote from said commutator.

8. The method defined in claim 2 wherein said armature further comprises a normal coil of wire wound on said core, said normal coil including a coil leg comprising lengths of wire disposed in said first slot, and wherein said winding step is performed before said normal coil is wound.

9. The method defined in claim 2 wherein said armature further comprises a normal coil of wire wound on said core, said normal coil including a coil leg comprising lengths of wire disposed in said first slot, and wherein said winding step is performed after said normal coil is wound.

10. The method defined in claim 5 wherein said armature further comprises a normal coil of wire wound on said core, said normal coil including a coil leg comprising lengths of wire disposed in one of said first and second slots, and wherein said winding step is performed before said normal coil is wound.

11. The method defined in claim 5 wherein said armature further comprises a normal coil of wire wound on said core, said normal coil including a coil leg comprising lengths of wire disposed in one of said first and second slots, and wherein said winding step is performed after said normal coil is wound.

12. The method defined in claim 8 wherein said winding step is performed using wire that is continuous with the wire of said normal coil.

13. The method defined in claim 9 wherein said winding step is performed using wire that is continuous with the wire of said normal coil.

14. The method defined in claim 10 wherein said winding step is performed using wire that is continuous with the wire of said normal coil.

15. The method defined in claim 11 wherein said winding step is performed using wire that is continuous with the wire of said normal coil.

16. The method defined in claim 1 wherein said vector R also has a known magnitude, and wherein the mass of said turn of wire times the perpendicular distance from the axial center of said shaft to the center of mass of said turn of wire is approximately equal to said known magnitude.

* * * * *